United States Patent [19]
Kray et al.

[11] 3,803,075
[45] *Apr. 9, 1974

[54] SOLUBLE POLYIMIDES FROM 2,6-DIAMINO-S-TRIAZINES AND DIANHYDRIDES

[75] Inventors: Raymond J. Kray, Berkeley Heights, N.J.; Roland A. E. Winter, Armonk, N.Y.

[73] Assignee: Ciba-Geigy Corporation, Ardsley, N.Y.

[*] Notice: The portion of the term of this patent subsequent to May 30, 1989, has been disclaimed.

[22] Filed: May 15, 1972

[21] Appl. No.: 253,362

Related U.S. Application Data

[63] Continuation-in-part of Ser. No. 889,017, Aug. 1, 1969, Pat. No. 3,666,723.

[52] U.S. Cl....... 260/30.2, 117/124 R, 117/126 GP, 117/128.4, 117/132 C, 161/197, 161/214, 161/227, 260/30.4 N, 260/30.6 R, 260/30.8 R, 260/30.8 DS, 260/32.2, 260/32.6 N, 260/32.8 N, 260/47 CP, 260/65, 260/78 TF

[51] Int. Cl.............................................. C08g 20/32
[58] Field of Search..... 260/47 CP, 65, 78 TF, 32.2, 260/32.4, 32.6 N, 32.8 N

[56] References Cited
UNITED STATES PATENTS
3,666,723  5/1972  Kray et al. ........................... 260/65

*Primary Examiner*—Lester L. Lee

[57] ABSTRACT

Soluble triazine-based polyimides are prepared by first reacting dianhydrides with s-triazine compounds containing at least two primary aromatic, aliphatic or cycloaliphatic amino groups to give triazine-based polyamic acids which, are then converted into polyimides. The polyimides are soluble in organic solvents. From said organic solutions, useful fibers, films, adhesives, coatings and composites can be prepared. The triazine-based polyimides possess high temperature oxidative stability, good mechanical properties and electrical properties and low void contents.

8 Claims, No Drawings

SOLUBLE POLYIMIDES FROM 2,6-DIAMINO-S-TRIAZINES AND DIANHYDRIDES

This application is a Continuation-in-Part of copending application, Ser. No. 889,017, filed Aug. 1, 1969 now U.S. Pat. No. 3,666,723.

BACKGROUND OF THE INVENTION

Polyimides are used in plastic applications where mechanical strength and long-term oxidative stability above 200°C is required. Since the polyimides as a class are generally infusible and insoluble, special problems arise in their fabrication into films, coatings, laminates, and adhesives. Conventionally, the polyimides are applied in the form of processable and soluble precursors, the polyamic acids. The polyamic acid is then converted into the polyimide with ring closure and the evolution of a molecule of water as follows:

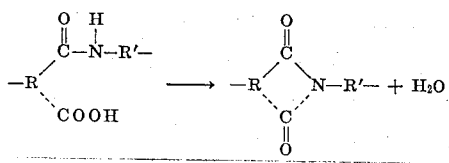

The use of polyamic acids as the precursors for polyimide resins has a number of disadvantages however. The polyamic acids cannot be stored because they are thermally unstable and even under refrigeration eventually tend to hydrolyze to low molecular weight polymers or slowly convert into insoluble resins. It is well known for instance, that the polyamic acids prepared from benzophenone tetracarboxylic acid dianhydride or pyromellitic dianhydride with m-phenylene diamine or methylenedianiline become insoluble when approximately 50 percent of the amic acid groups are converted into imide groups.

Upon processing the polyamic acids, i.e., coating, film casting, laminating, adhesive bonding, and molding the water evolved during imide formation frequently becomes entrapped in the shaped structure causing void formation which lowers the final strength properties and provides new surfaces for oxidative attack during high temperature use. This is particularly true when shaped structures of greater than a few mils thickness are fabricated.

Furthermore, the complete conversion of polyamic acid to the polyimide requires considerable time and prevents the development of more rapid and economical fabrication procedures.

For some applications, it would also be desirable to use hot coatings and impregnations to lower the viscosity of the resin solution and more efficiently remove the air and moisture from the coating surfaces. This is not possible with the thermally unstable polyamic acid solutions.

During laminating and molding operations, considerable scrap may be produced caused by excessive resin flow. Reuse of this scrap which is generally insoluble and infusible is not presently possible.

It is quite unexpected that the polyamic acid precursor of benzophenone tetracarboxylic acid dianhydride and bis (aminoanilino)-s-triazines of this invention could be completely imidized and retain solubility at high concentrations in such polar solvents as dimethylformamide, N,N'-dimethylacetamide, pyridine, dimethylsulfoxide and N-methylpyrrolidone. This solubility allows the polyimides of this invention to have the following advantages over the polyamic acids in high temperature polymer applications.

a. The polyimides in solution are hydrolytically stable and have a long storage life at high solids concentrations. Unlike the polyamic acids, neither the solutions nor prepregs prepared from the polyimides of this invention need to be stored under refrigeration before use. Furthermore, the soluble polyimides of this invention can be stored and shipped in the dry state and dissolved to form a coating or laminating solution at the site when needed.

b. Upon molding, film casting, laminating, adhesive bonding, and coating with the polyimides of this invention no volatiles are evolved. By contrast, polyamic acids evolve water during fabrication leading to undesirable voids in the fabricated product.

c. Scrap from the processing and fabrication steps of the polyimides of this invention can be reused because the scrap retains solubility.

d. The fabrication of thick coatings of polyimides is accelerated by the soluble polyimides of this invention. For instance, in wire coating operations the wire must pass repeatedly through the polyamic acid solution in order to build up a thick protective coat. Between passes, the wire is heated to allow the water of imidization to escape otherwise blistering results. The soluble polyimides can be applied in fewer passes in less time because imidization has taken place prior to the coating operation.

e. Solutions of the soluble polyimides of this invention can be heated to just under the boiling point of the solvent in order to reduce viscosity and give better impregnation and wetting of reinforcements during the preparation of prepregs.

DETAILED DISCLOSURE

The soluble polyimides of this invention are characterized by a recurring unit having the following structural formula:

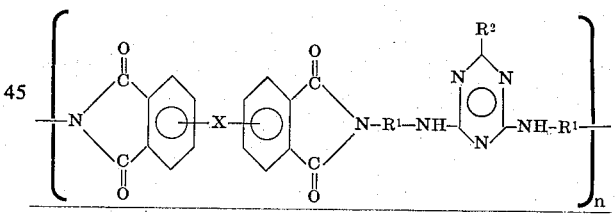

wherein

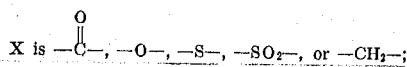

$R^1$ is a divalent organic radical selected from aromatic, aliphatic and cycloaliphatic series;

$R^2$ is hydrogen, diarylamino, di(lower)alkyl amino, anilino, N-(lower)alkyl anilino, pyrrolidino, piperidino or phenyl groups; and $n$ is an integer of 2 or more.

The (lower)alkyl group employed herein means a straight, or branched chain alkyl group having up to four carbon atoms. Examples of such groups are methyl, ethyl, propyl, isopropyl, butyl and the like.

The polyimides of the present invention have high tensile properties, exceptional stability to heat and water and good electrical properties. Thus, these polyimides are particularly useful as shaped structures such as films, fibers, filaments and composites with reinforcing agents such as glass fabrics, graphite and boron fibers.

The starting materials employed in the preparation of the polyimides of this invention are s-triazine compounds containing two primary aryl, alkyl or cycloalkyl amino groups and aromatic tetracarboxylic acid anhydrides. The triazine based diamines are characterized by the formula:

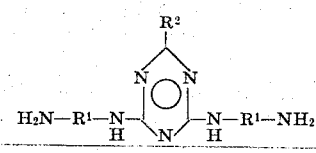

wherein
$R^1$ and $R^2$ are as defined above. More specifically, $R^1$ is selected from the following groups.
  a. ortho-, meta- and para-phenylene, biphenylene, naphthylene, anthracylene, 4,4′-oxydiphenylene, 4,4′-thiodiphenylene, 4,4′-methylene diphenylene and 4,4′-sulfonyl diphenylene.
  b. alkylene groups having from two to eight carbon atoms, and
  c. cycloalkylene groups, such as cyclopentylene, cyclohexylene and the like.

The preferred diamines are where $R^1$ is phenylene or the group

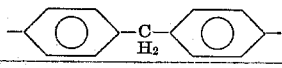

The group $R^2$ mentioned above can be hydrogen or phenyl or a substituted amino group illustrated below: dialkylamino groups such as, dimethylamino, diethylamino, dipropylamino, diisopropylamino, dibutylamino and the like; pyrrolidino, piperidino, morpholino, anilino, N-(lower)alkylanilino compounds such as N-methyl anilino, N-ethylanilino, N-butylanilino; diarylamino group such as diphenylamino, N-naphthyl anilino, dinaphthylamino, phenyl, naphthyl and the like.

The following s-triazine compounds exemplify a few types of diamines that can be employed in preparing the polyimides of this invention:
  a. 2-diphenylamino-4,6-bis(m-aminoanilino)-s-triazine
  b. 2-N-methylanilino-4,6-bis(m-aminoanilino)-s-triazine
  c. 2-(1′-pyrrolidyl)-4,6-bis(p-aminoanilino)-s-triazine
  d. 2-diethylamino-4,6-bis(4′-amino-1′-piperidyl)-s-triazine
  e. 2-dimethylamino-4,6-bis(2′-aminoethylamino)-s-triazine
  f. 2-phenyl-4,6-bis(o-aminoanilino)-s-triazine
  g. 2-N-ethylanilino-4,6-bis[4′-(4″-aminobenzyl)-anilino]-s-triazine.

The dianhydrides useful in this invention are characterized by the general formula:

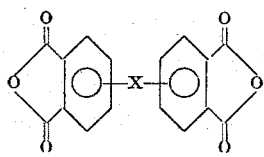

wherein X is as defined above.

The preferred aromatic dianhydrides are where X is carbonyl, methylene, oxygen or sulfonyl.

The following species are typical of tetracarboxylic acid dianhydrides suitable for practicing the invention:
2,3,3′,4′-benzophenone tetracarboxylic dianhydride
3,3′,4,4′-benzophenone tetracarboxylic dianhydride
2,2′,3,3′-benzophenone tetracarboxylic dianhydride
3,3′,4,4′-biphenyl tetracarboxylic dianhydride
2,2′,3,3′-biphenyl tetracarboxylic dianhydride
bis-(3,4-dicarboxyphenyl)ether dianhydride
bis-(3,4-dicarboxyphenyl)sulfone dianhydride
bis-(2,3-dicarboxyphenyl)ether dianhydride
bis-(2,3-dicarboxyphenyl)methane dianhydride
bis-(3,4-dicarboxyphenyl)methane dianhydride The polyimides are prepared by a process comprising reacting the above described s-triazine diamines with dianhydrides in an organic reaction medium which is a solvent for at least one of the reactants, preferably under substantially anhydrous conditions, at a temperature below 100°C. The product of this reaction is a polyamic acid represented by the following general formula:

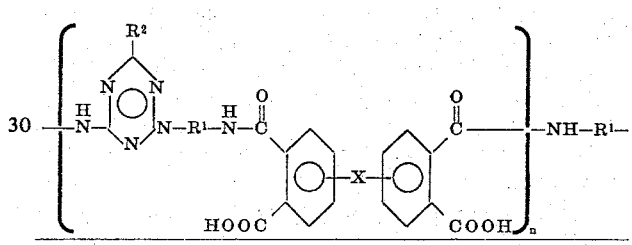

More specifically, the reaction can be carried out conveniently in a number of ways. The s-triazine diamine and the dianhydride can be premixed as dry solids in equimolar amounts and the resulting mixture can be added, in small portions and with agitation, to the organic solvent. This method is particularly effective in reactions which are relatively exothermic. However, it is also possible to add slowly with agitation the solvent to the premixed reactants. Another variation is to dissolve the s-triazine diamine in the solvent and then add thereto the dianhydride at a rate that provided a controllable rate of reaction. It is also possible to add the reactants separately and in small portions to the solvent or to dissolve the reactants in separate portions of the solvent and then slowly adding the two solutions to the reaction vessel.

The degree of polymerization of the polyamic acid is subject to a deliberate control. The molar amounts of the reactants under the prescribed conditions can vary from 0.5 to 1 to as high as 2 to 1 of one reactant to another. The resulting polymers will be either anhydride or amine terminated depending on the relative ratios of the reactants employed. Highest molecular weight polymers are obtained when stoichiometric amounts of the reactants are used.

In the preparation of the polyamic acid intermediate, it is essential that the molecular weight be such that the inherent viscosity of the polyamic acid is at least 0.05, preferably 0.1–5.0. The inherent viscosity is measured at 30°C at a concentration of 0.5 percent by weight of the polymer is a suitable solvent, e.g., N,N-dimethylacetamide, N-methylpyrrolidone, dimethylformamide, etc. To calculate inherent viscosity, the viscosity of the polymer solution is measured relative to that of the solvent alone.

Inherent viscosity =

$$\frac{\text{Natural logarithm} \times \frac{\text{Viscosity of solution}}{\text{Viscosity of solvent}}}{C}$$

wherein C is the concentration expressed in grams of polymer per 100 milliliters of solution. As known in the polymer art, inherent viscosity is directly related to the molecular weight of the polymer.

The quantity of organic solvent used in the preferred process need only be sufficient to dissolve enough of one reactant, preferably the diamine, to initiate the reaction of the diamine and the dianhydride. For forming the composition into shaped articles, it has been found that the most successful results are obtained when the solvent represents at least 40 percent of the polymer solution. That is, the solution should contain 0.05–70 percent of the polymeric component.

The soluble polyimides of this invention have utility when dissolved in a solvent preferably at weight percent concentrations of 5 percent or greater. There is no particular upper concentration level where utility is lost but practical considerations of solution storage stability and high solution viscosities find it necessary to generally apply the soluble polyimides from solution at 70 weight percent or lower concentrations.

The solvents useful in the solution polymerization process for synthesizing the intermediate polyamic acid compositions in the process of preparing the polyimides are the organic solvents whose functional groups do not react with either of the reactants (the diamines or the dianhydrides) to a greater extent than the reactants, preferably for both of the reactants. The normally liquid organic solvents of the N,N-dialkylcarboxamide class are useful as solvents in the process of this invention. The preferred solvents are the lower molecular weight members of this class, particularly N,N-dimethylformamide and N,N-dimethylacetamide. They may easily be removed from the polyamide-acids and soluble polyimides of this invention by evaporation, displacement or diffusion. Other typical compounds of this useful class of solvents are:

N,N-diethylformamide
N,N-diethylacetamide
N-methylcaprolactam
dioxane
dimethylsulfoxide
N-methyl-2-pyrrolidone
tetramethylurea
pyridine
dimethylsulfone
hexamethylphosphoramide
tetramethylenesulfone
formamide
N-methylformamide
butyrolactone The solvents can be used alone, as a mixture of two or more solvents, or in combination with poor solvents such as benzene, benzonitrile, xylene, toluene, and cyclohexane.

To determine a specific time and a specific temperature for forming the polyamic acid of one of the specified diamines and a specified dianhydride, several factors must be considered. The maximum permissible temperature will depend on which diamine is used, which dianhydride is used, the particular solvent, the percentage of polyamic acid desired in the final composition and the minimum period of time that one desires for the reaction to take place. For most combinations of meta-phenylenediamine or paraphenylenediamine s-triazine derivatives and the dianhydrides falling within the definitions given above, it is possible to form compositions of 100 percent polyamic acid by conducting the reaction below 100°C. However, temperatures up to the boiling point of the solvent or higher when pressure equipment is employed may be tolerated to provide shapable compositions. The polyamic acid prepared as described above can be isolated by evaporating the solvent at temperatures lower than 70°C. The polyamic acid is soluble in organic solvents.

The soluble polyimides of this invention are preferably formed in a two step reaction if high molecular weight polyimides are desired.

In the first step, benzophenone tetracarboxylic acid dianhydride is reacted with the bis(aminoanilino)-s-triazine to form the polyamic acid:

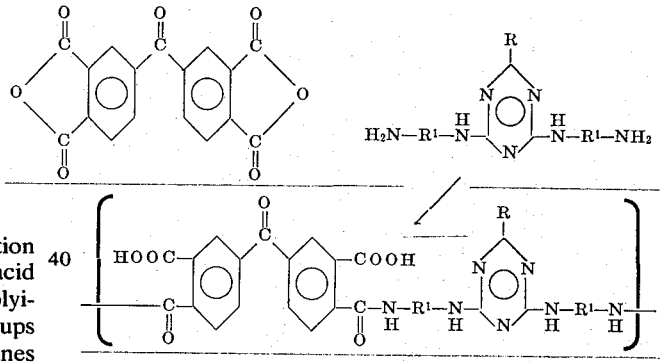

The polyamic acid can be converted to the soluble polyimide by a variety of methods. The polyamic acid can be heated in the solid state in an oven at temperatures preferably above 150°C until imidization is completed. Alternately, the polyamic acid can be heated in solution at temperatures above 150°C if the water of imidization is removed rapidly as it is generated and before it has the opportunity to hydrolyze the unconverted polyamic acid. The polyamic acid can also be heated as a powdery suspension in a non-solvent at elevated temperatures to produce the soluble polyimides of this invention.

As an alternate to thermal imidization it has also been found useful to chemically react solutions of the polyamic acid with acetic anhydride or acetic anhydride-pyridine mixtures to yield the soluble polyimides of this invention. The ratio of acetic anhydride to pyridine may vary from just above zero to infinite mixtures. It is believed that the pyridine functions as a catalyst for the action of the dehydrating agent, the acetic anhydride. Other possible dehydrating agents for use include propionic anhydride, butyric anhydride, valeric anhydride, acid mixed lower fatty acid anhydrides. Other tertiary amine catalysts include triethylamine, triethylene diamine, isoquinoline, $\alpha,\beta$ or $\gamma$ picoline, 2,5-lutidine, etc. Chemical imidization of polyamic acids has been well described in the literature and no special conditions or deviations from past practices are necessary in imidizing the polyamic acids from the bis-(aminoanilino)-s-triazines to produce the soluble polyimides of this invention. For instance, treatment of the polyamic acids with carbodiimides, e.g., dicyclohexylcarbodiimide serves also to dehydrate and effectively cyclize the polyamic acid to yield the soluble polyimide.

Finally, in order to cyclize these polyamic acids to soluble polyimides a combination of the above treatments may be used. The polyamic acid may be partially converted to the polyimide in a chemical conversion treatment and then cyclization to the polyimide may be completed by subsequent heat treatment or visa versa.

The polyimides of this invention find many applications in a wide variety of physical shapes and forms. Among the most significant of these forms are coatings, films and fibers. The useful combination of the desirable physical and chemical characteristics of this polymer is unique. Films and fibers of this polymer not only possess excellent physical properties at room temperature but retain their strength and excellent response to work-loading at elevated temperatures for prolonged periods of time. Behavior of this type offers commercial utility in a wide range of end uses. These polyimide polymers display excellent resistance to strong acids and alkalies, to corrosive atmospheres, outstanding resistance to degradation by high energy particles and gamma-ray radiation. The polymer resists melting upon exposure at 500°C for extended periods while retaining hitherto unrealized high proportions of room temperature physical properties. Because of the unusual and surprising solubility of the polyimide, it may be processed into shaped articles such as films amd fibers by conventional techniques. Solutions of the s-triazine containing polyimides can be used to impregnate reinforcing fibers and fabrics like glass, boron, metal oxide whiskers and graphite. These prepregs can then be cured to form rigid laminates or composites or to form strong thermally resistant structural adhesive bonds between aluminum, stainless steel, titanium or other metals.

Films formed from the polymer of this invention may be used wherever films have heretofore been used. They serve advantageously in an extensive variety of wrapping, packaging and bundling applications. Additionally, the polymer and film-forming polymer may be used in automobile and aviation interior head lining materials, decorative trim, high temperature electrical insulation such as for slot liners, in dry transformers, capacitors, cable wrappings, etc., packaging of items to be exposed to high temperature or high energy radiation while within the package, corrosion-resistant pipe, duct work, containers and container linings, and laminating structures where the films are bonded to the sheet metal or foils, and a variety of other similar and related uses. In fiber form, the polymer offers possibilities for high temperature electrical insulation, protective clothing and curtains, filtration media, packing and gusseting materials, brake linings and clutch facings.

To further illustrate the nature of this invention and process employed in preparing the triazine based polyimides, the following examples are presented below.

Example 1

To a 200 ml. three neck flask equipped with a stirrer and nitrogen inlet was charged 16.46 g. of 2-diphenylamino-4,6-bis(m-aminoanilino)-s-triazine dissolved in 85 ml. of N,N-dimethylacetamide. Benzophenone tetracarboxylic acid dianhydride (BTDA), 9.66 g., was added slowly to the stirred mixture until a clear, viscous solution resulted at room temperature. This solution containing 22.5 percent by weight of polyamic acid was added to a rapidly stirred solution of 300 ml. toluene, 60 ml. pyridine, and 20 ml. acetic anhydride. The resulting precipitate was added to 100 ml. of acetic anhydride which was refluxed for 16 hours. The polyimide precipitated from this solution as it was formed. It was filtered off, washed with ether and dried at 180°C and 0.5 mm. to give 13.5 g. of product. It was soluble at room temperature in 25 g. of N,N-dimethylacetamide and had intrinsic viscosity of 0.60. The infra red spectra of this polyimide showed the expected imide absorption bands at 715 $cm^{-1}$ and 1,780 $cm^{-1}$ but the complete absence of amide absorption at 1,650 $cm^{-1}$ which indicated that the polyamic acid was completely converted to the polyimide. These spectra were identical to those produced by casting a film of the polyamic acid and curing it for 1 hour at 300°C to yield the polyimide.

Example 2

To a solution of 5.49 parts of 2-diphenylamino-4,6-bis(m-aminoanilino)-s-triazine dissolved in 45 ml. of N-methylpyrrolidone under nitrogen atmosphere was added with stirring 3.22 parts of benzophenone tetracarboxylic acid dianhydride (BTDA) in portions over a 15 minute period. The solution was stirred for 16 hours at room temperature. The intrinsic viscosity of the polyamic acid was 0.55.

The polyamic acid solution was vigorously stirred under a dry nitrogen atmosphere and the reaction flask was preheated to a temperature of 200°C. The reaction mixture temperature quickly rose to 185°C and a current of nitrogen gas was continuously passed over the stirred solution to remove the water of imidization while the temperature was maintained at 185°C for a 3 hour period. The solution was cooled to room temperature and the soluble polyimide was precipitated by adding the solution to 500 ml of acetone with rapid agitation. The polyimide had an intrinsic viscosity of 0.49 and the solubility characteristics at room temperature given below.

Table I

Solubility of Polyimide from
2-Diphenylamino-4,6-bis(m-aminoanilino)-s-triazine and BTDA

| Solvent | Wt. % Solubility |
| --- | --- |
| N-methylpyrrolidone | 10 |
| Dimethylsulfoxide | 20 |
| N,N-dimethylacetamide | 35 |
| Pyridine | 35 |
| Dimethylformamide | 23 |
| Tetrachloroethane | 5 |

The polyimide power was compression molded at 375°C and 4,000 psi to yield a tough, void free molded disc.

The polyimide powder was dissolved in dimethylformamide at 20 percent concentration and the resulting solution was used to impregnate 112 E glass cloth. The impregnated cloth was dried at 225°C for 16 hours and 1 hour at 300°C. The dried prepreg was bonded to etched steel at 315°C. and 50 psi in a press. The adhesive bond had a lap shear value of 2,532 psi at room temperature.

Example 3

The reaction conditions of Example 2 were carried out with benzophenone tetracarboxylic acid dianhydride and the following diamines: 2-dimethylamino-4,6-bis(m-aminoanilino)-s-triazine; 2-phenyl-4,6-bis(m-aminoanilino-s-triazine; 4,6-bis(m-aminoanilino)-s-triazine; 2-diphenylamino-4,6-bis[4'-(4''-aminobenzyl)-anilino]-s-triazine; and 2-amino-4,6-bis(m-aminoanilino)-s-triazine.

The resulting polyimides were tested for solubility in N-methyl pyrrolidone at a 10 percent concentration level. The results of these tests are given in Table II.

Table II

Solubility of s-Triazine Polyimides

| $R^2$ | $R^1$ | I.V. | Solubility |
|---|---|---|---|
| Dimethylamino | m-phenylene | 0.67 | Soluble |
| Phenyl | m-phenylene | 0.48 | Soluble |
| Hydrogen | m-phenylene | 0.41 | Soluble |
| Diphenylamino | Diphenylenemethane | 0.49 | Soluble |

Example 4

To a 300 ml. 3 neck flask fitted with a stirrer and nitrogen inlet tube was added 32.9 g. (0.06 moles) of 2-diphenylamino-4,6-bis(m-aminoanilino)-s-triazine suspended in 74 ml. of methyl ethyl ketone. To this slurry was added, over a period of 1 hour, 12.9 g. (0.04 moles) of benzophenone tetracarboxylic acid dianhydride suspended in 75 ml. of methyl ethyl ketone. The walls of the flask were washed with an additional 50 ml. of methyl ethyl ketone and the reaction mixture was stirred for 1 hour. The precipitated polyamic acid was then filtered off and dried at 50°C and 10 mm. pressure for 17 hours. A 87 percent yield, 40.0 g. of polyamic acid of intrinsic viscosity 0.1 was obtained.

The polyamic acid was then heated at 160°C in an oven for 5 hours to yield the polyimide. The polyimide was soluble at 40 percent concentration in N-methyl pyrrolidone and at 20 percent concentration in dioxane. The infra red and NMR spectra of this polyimide showed that its polymer chain was terminated with amino groups.

Example 5

To a solution of 2.70 g. (0.005 moles) of 2-diphenylamino-4,6-bis(m-aminoanilino)-s-triazine in 20 ml. of N-methylpyrrolidone was added 1.55 g. (0.005 moles) of 4,4'-oxydiphthalic anhydride. The solution was stirred at room temperature under a nitrogen atmosphere for 15 hours. The intrinsic viscosity of the polyamic acid was 0.39.

The flask containing the polyamic was immersed in a preheated oil bath at 200°C. The solution was rapidly agitated under a current of nitrogen gas for 4 hours. Upon cooling the solution to room temperature, the polyimide remained in solution. A portion of the solution was added to a five fold excess of acetone to precipitate the polyimide which had an intrinsic viscosity of 0.32. The infra red spectra of this polymer showed that it had been converted entirely into a polyimide and showed no amic acid absorption.

Substitution of 4,4'-oxidiphthalic anhydride in the example above by either 4,4'-methylenediphthatic anhydride (1.54 g., 0.005 moles) or 4,4'-sulfonyldiphthalic anhydride (1.79 g., 0.005 moles) leads analogously to polyimides that are soluble in N-methylpyrrolidone.

Example 6

To a 200 ml. three neck flask equipped with a stirrer and a nitrogen inlet was charged 6.41 g. (0.01 moles) of 2-diphenylamino-4,6-bis-[4'-(4''-aminobenzyl)-anilino]-s-triazine and 50 ml. of N,N-dimethylacetamide. To this stirred solution over a period of one-half hour was added 3.22 g. (0.01 moles) of powdered benzophenone tetracarboxylic acid dianhydride. The reaction mixture was stirred at room temperature for 18 hours. The intrinsic viscosity of the polyamic acid was 0.43.

To the viscous polyamic acid solution was added 24 ml. of 1:1 mixture of acetic anhydride pyridine and the solution was heated at 120°C for 1 hour. The solution was then poured into 500 ml. of rapidly agitated water to precipitate the polyimide as a fine yellow powder. The polyimide was isolated by filtration, washed with acetone and dried for 5 minutes at 300°C to insure complete removal of water and solvents.

The polyimide was molded at 320°C and 4,000 psi pressure to yield a tough, void-free, amber colored disc.

Example 7

A laminating varnish containing 231 g. (30 percent by weight) of the polyamic acid of 2-diphenylamino-4,6-bis(m-aminoanilino)-s-triazine and benzophenone tetracarboxylic acid dianhydride in 540 g. of N,N-dimethylacetamide was prepared by the procedure of Example 1. The polyamic acid had an intrinsic viscosity of 0.35 and a solution viscosity of 3,000 cp.

The polyamic acid solution was slowly added to 150 g. of refluxing N,N-dimethylacetamide under a nitrogen atmosphere. The addition of the polyamic acid was completed in 1 hour while the contents of the receiving flask were stirred and maintained at reflux temperature (166°C). This temperature was maintained for 3 hours while a stream of nitrogen was slowly passed through the stirred mixture. When cooled to room temperature the polyimide solution had a viscosity of 2,510 cp and resin content of 25.7 percent The intrinsic viscosity of the polyimide was 0.37.

The polyimide solution was used to impregnate 3.5 feet of 6 inch style 1581 E (A1100S finish) glass cloth. The prepreg was dried for one hour at 125°C and cut in to 6" × 6" squares. Lamination of 12 plies was carried out at 315°C and 250 psi. for 1 hour. The resin content of the laminate was 27 percent by weight and it had a short beam shear value of 4,500 psi flexural strength 55,380 psi and flexural modulus of $2.77 \times 10^6$ psi at room temperature. Density measurements and optical examinations of the cross-sections of the laminate showed that the laminate was essentially free of voids.

Example 8

The polyimide solution in Example 7 was cast as a coating on aluminum foil. The foil was placed in an oven at room temperature and the oven was raised to a temperature of 300°C over a period of one hour and then maintained at 300°C for 1 hour. The foil was then placed in concentrated hydrochloric acid which dissolved the aluminum and released the polyimide film which was washed with water and dried. The film withstood repeated 180° flexures without cracking. The film had a tensile strength of 16,400 psi, tensile modulus of 574,000 psi and percent elongation to break of 6.47 percent.

When the film was aged in a circulating air oven at 300°C it retained 94.7 percent of its weight for up to 666 hours. It withstood flexural tests and did not embrittle until 768 hours of oxidative aging at 300°C.

What is claimed is:

1. A solution of a polyimide in an organic solvent which is substantially non-reactive with the reactants from which the polyimide is prepared, said polyimide having the structure

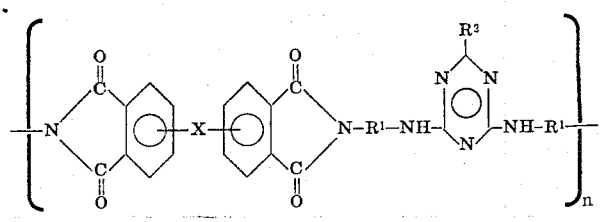

wherein

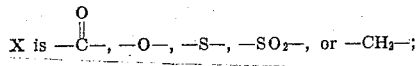

$R^1$ is a divalent organic radical selected from the group consisting of
   a. ortho-, meta- and para-phenylene, biphenylene, naphthylene, anthracylene, 4,4'-oxydiphenylene, 4,4'-thiodiphenylene, 4,4'-methylenediphenylene and 4,4'-sulfonyldiphenylene;
   b. alkylene groups having from 2 to 8 carbon atoms, and
   c. cycloalkyl groups, $R^2$ is hydrogen, diarylamino, di(lower)alkyl amino, anilino, N-(lower)alkyl anilino, pyrrolidino, piperidino or phenyl groups, and $n$ is an integer of 2 or more.

2. A composition of claim 1 wherein the organic solvent is dimethylformamide, N,N-dimethylacetamide, N-methyl-2-pyrrolidone, hexamethylphosphoramide, dioxane, dimethyl sulfoxide or butyrolactone.

3. A composition of claim 2 wherein in the polyimide X is carbonyl, oxygen or sulfur group, $R^1$ is m - phenylene, or the group

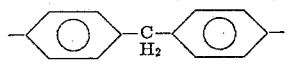

and $R^2$ is hydrogen, diphenylamino, phenyl or dimethylamino group.

4. A composition of claim 1 wherein X is carbonyl group, $R^1$ is m - phenylene group, $R^2$ is diphenylamino group and the solvent is N,N-dimethylacetamide.

5. A composition of claim 4 wherein the solvent is N-methyl pyrrolidone.

6. A composition of claim 4, wherein the solvent is methyl ethyl ketone.

7. A composition of claim 1 wherein X is oxygen, $R^1$ is m - phenylene group, $R^2$ is diphenylamino group and the solvent is N-methyl pyrrolidone.

8. A composition of claim 1 wherein X is carbonyl group, $R^1$ is the group

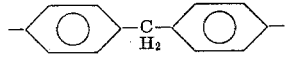

$R^2$ is diphenylamino group and the solvent is N,N-dimethylacetamide.

* * * * *